United States Patent
Bondu et al.

(10) Patent No.: US 8,923,351 B2
(45) Date of Patent: Dec. 30, 2014

(54) DEVICE FOR PRODUCING HIGH FREQUENCIES BY MEANS OF LIGHT FREQUENCY BEATING

(75) Inventors: François Bondu, Servon sur Vilaine (FR); Marc Brunel, Rennes (FR); Mehdi Alouini, Gosne (FR); Marc Vallet, Thorigne-Fouillard (FR); Goulc'hen Loas, Saint Aubin d'Auligne (FR); Marco Romanelli, Rennes (FR)

(73) Assignee: Centre National de la Recherche Scientifique, Paris (FR)

( * ) Notice: Subject to any disclaimer, the term of this patent is extended or adjusted under 35 U.S.C. 154(b) by 79 days.

(21) Appl. No.: 13/698,251

(22) PCT Filed: May 9, 2011

(86) PCT No.: PCT/EP2011/057425
§ 371 (c)(1),
(2), (4) Date: Jan. 8, 2013

(87) PCT Pub. No.: WO2011/144480
PCT Pub. Date: Nov. 24, 2011

(65) Prior Publication Data
US 2013/0100973 A1    Apr. 25, 2013

(30) Foreign Application Priority Data

May 18, 2010 (FR) ...................... 10 02085

(51) Int. Cl.
*H01S 3/10* (2006.01)
*H01S 3/13* (2006.01)
*H01S 3/139* (2006.01)
*H01S 3/08* (2006.01)

(52) U.S. Cl.
CPC ............. *H01S 3/1306* (2013.01); *H01S 3/1392* (2013.01); *H01S 3/0809* (2013.01); *H01S 3/1398* (2013.01)

USPC .................. 372/28; 372/25; 372/27; 372/31; 372/38.01; 372/38.07

(58) Field of Classification Search
CPC ... H01S 3/1306; H01S 3/1392; H01S 3/0809; H01S 3/1398
USPC ..................... 372/25, 27, 28, 31, 38.01, 38.07
See application file for complete search history.

(56) References Cited

U.S. PATENT DOCUMENTS 3,506,362 A * 4/1970 Doyle et al. ................... 356/485
5,847,974 A * 12/1998 Mori et al. ....................... 702/94

(Continued)

OTHER PUBLICATIONS

L. Aballea, et al, "Optoelectronic Difference-Frequency Synthesiser: Terahertz-Wave for High-Resolution Spectroscopy", The European Physical Journal Applied Physics, Feb. 2009, pp. 21201-p1-21201-p6, vol. 45, No. 2, XP002617043.

(Continued)

*Primary Examiner* — Yuanda Zhang
(74) *Attorney, Agent, or Firm* — Baker & Hostetler LLP

(57) ABSTRACT

In the field of the production of very high frequencies, for example from 1 gigahertz to several terahertz, by beating the frequencies of two laser beams together, a device includes a resonant optical cavity having very stable dimensions receiving the beams, with for each beam, an interrogation device of the resonant cavity supplying an electrical signal representing the difference in frequency between the light frequency of the beam and a resonance frequency of the resonant cavity. The frequency of each beam is servo controlled to minimize the frequency difference observed. The laser beams are produced by a dual-frequency laser producing two beams of different frequencies and orthogonal polarizations. A polarization separator is used for separate servo control of the beams according to polarization, and a polarizer is placed behind a main output of the resonant cavity producing an electromagnetic beam mixing the two polarizations and amplitude-modulated at the beat frequency.

12 Claims, 1 Drawing Sheet

(56) References Cited

U.S. PATENT DOCUMENTS 6,654,394 B1 * 11/2003 Sellin et al. ............. 372/32
6,807,203 B2 * 10/2004 Adams ............. 372/32
7,787,505 B1 * 8/2010 Turchette et al. ....... 372/29.023
2010/0315642 A1 * 12/2010 Chow et al. ............. 356/432

OTHER PUBLICATIONS

Miao Zhu, et al., "Short and Long Term Stability of Optical Oscillators", Proceedings of the Frequency Control Symposium, May 27, 1992, pp. 44-55, IEEE, New York, USA, XP010056751.

Peter R. Herezfeld, et al., "Terahertz Photonics for Imaging", 15th International Conference on Microwaves, Radar and Wireless Communications, Warsaw, Poland, May 17-19, 2004, pp. 1106-1111, IEEE, Piscataway, NJ, USA, XP010742088.

Masahiko Tani, et al., "Generation of Terahertz Radiation by Photomixing with Dual-and Multiple-Mode Lasers", Semiconductor Science and Technology, Jul. 1, 2005, pp. S151-S163, vol. 20, No. 7, Institute of Physics Publishing Ltd., GB, XP020086536.

G. Ruoso, et al., "ND:YAG Laser Frequency Stabilization to a Supercavity at the 0.1 Hz Level", Optics Communications, Jan. 1, 1997, pp. 259-262, vol. 133, No. 1, North-Holland Publishing Co., Amsterdam, NL, XP004015702.

Shuji Matsuura, et al., "A Tunable Cavity-Locked Diode Laser Source for Terahertz Photomixing", IEEE Transactions on Microwave Theory and Techniques, Mar. 1, 2000, pp. 380-387, vol. 48, No. 3, IEEE Service Center, Piscataway, NJ, USA, XP011037912.

* cited by examiner

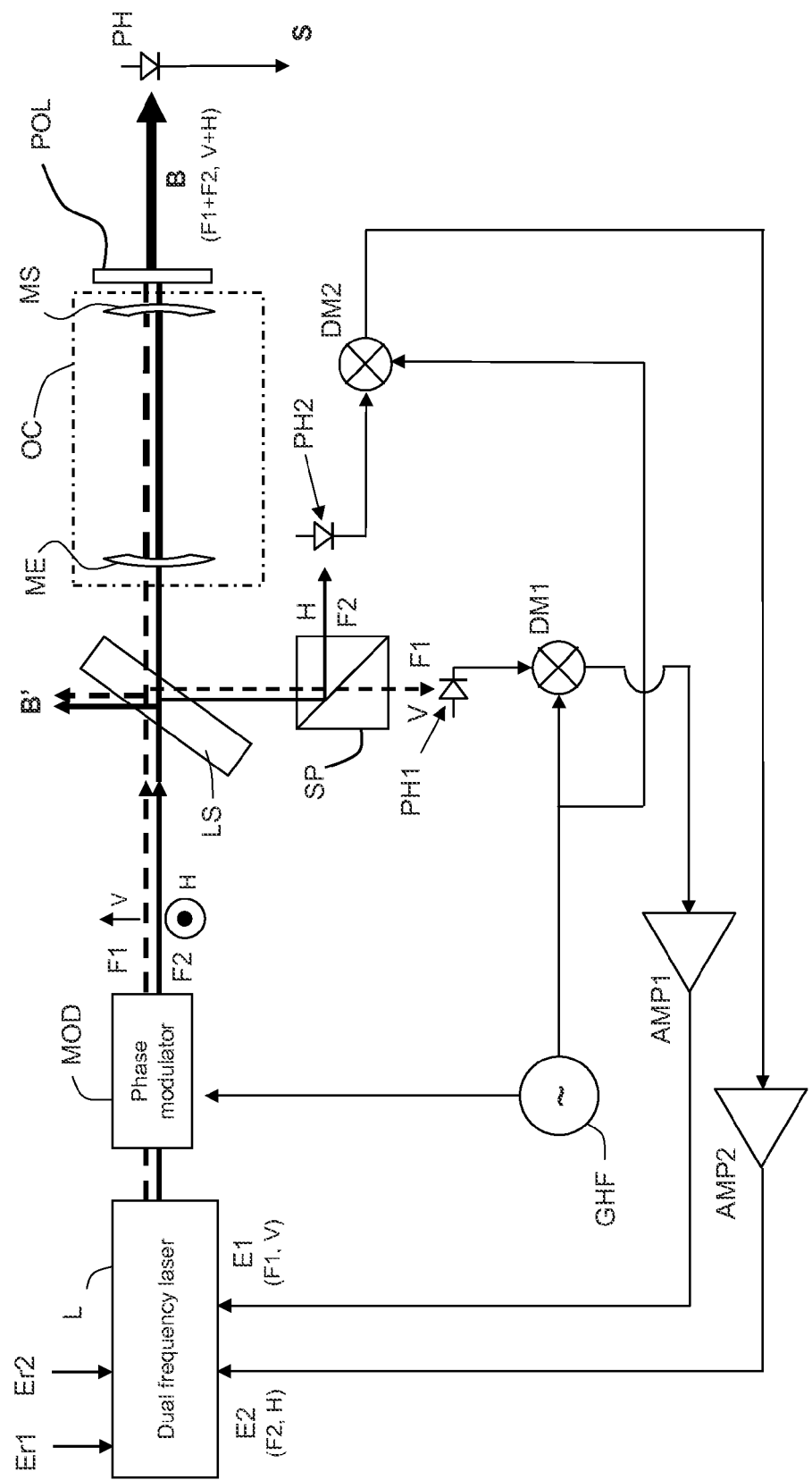

DEVICE FOR PRODUCING HIGH FREQUENCIES BY MEANS OF LIGHT FREQUENCY BEATING

CROSS-REFERENCE TO RELATED APPLICATIONS

This application is a National Stage of International patent application PCT/EP2011/057425, filed on May 9, 2011, which claims priority to foreign French patent application No. FR 1002085, filed on May 18, 2010, the disclosures of which are incorporated by reference in their entirety.

FIELD OF THE INVENTION

The invention relates to the production of very high frequencies, for example from 1 gigahertz to several terahertz, by beating the frequencies of two laser beams together.

BACKGROUND

There are conventional electronic circuits that are used to produce electrical signals with frequencies up to the gigahertz range, but it is much more difficult to produce higher frequencies. This is achieved in the domain of microwaves with Gunn diodes or Impatt diodes, up to about 100 gigahertz but with powers that decrease as the frequency increases. Frequencies in the 'terahertz domain', i.e. frequencies from 100 gigahertz to 10 terahertz (at the limit of very far infrared) cannot be effectively obtained through purely electronic circuits.

Optical or electronic signals in the terahertz domain would, however, be useful, e.g. for imaging (infrared or visible opaque media imaging), or for broadband telecommunications through the atmosphere (at frequencies not undergoing too much atmospheric absorption), or for the spectrometry of certain molecules.

It has been suggested that very high frequencies may be produced through the difference between the frequencies of electromagnetic light waves. Here light waves will be understood to mean waves in a wavelength range covering not only visible, but also infrared and ultraviolet light. To give an idea of the order of magnitude: an infrared laser beam with a wavelength of 1 micron corresponds to a light frequency of approximately 300 terahertz ($300 \times 10^{12}$ hertz). If two light beams with frequencies of 300 and 301 terahertz are mixed together, a 1 terahertz subtractive beat is obtained. Thus a 1 terahertz amplitude-modulated light beam can be produced, and this beam can be used either in optical form or in the form of an electronic signal by conversion in a fast photodiode or a photoswitch.

But the difficulty is that the signal produced by beating two light frequencies has a frequency that is extremely dependent on the stability of these two starting frequencies. These frequencies are produced by monochromatic lasers, but the lasers are not naturally sufficiently stable. They have a significant frequency noise or phase noise.

SUMMARY OF THE INVENTION

One object of the invention is therefore to provide a device for producing very high frequencies, by beating light beams, which best compensates for the natural instabilities of phase and frequency of the laser beams used to produce the beat. Another object is to provide a device that is tunable, i.e. that can be used to produce different frequencies according to need whilst observing a high stability constraint for the frequency produced.

Therefore according to the invention a device is provided for producing amplitude-modulated radiation at a very high frequency from the beat frequency of two laser beams emitting different light frequencies, the device comprising:
- a resonant optical cavity having very stable dimensions, receiving the two laser beams,
- for each laser beam, a respective interrogation device of the resonant cavity capable of supplying an electrical signal representing the difference in frequency between the light frequency of the beam and a resonance frequency of the resonant cavity,
- and servo control means for separately controlling the light frequency of each of the laser beams according to the frequency difference observed, this device being characterized in that:
- the laser beams have orthogonal polarizations,
- the servo control means comprise a polarization separator for the separate servo control of the beams according to their polarization,
- and a polarizer is placed at the output of the device on the path of the two superposed beams for producing an amplitude-modulated radiation beam at the beat frequency, mixing the two polarizations.

The system may comprise one or two main outputs, one of the outputs being the light transmitted by the cavity and the other being a fraction of the laser beams extracted before the cavity.

The two laser beams are very advantageously produced by a dual-frequency laser producing two beams with the same axis having different frequencies and orthogonal polarizations.

The polarizer is preferably a polarizer with an angle such that the two transmitted beams are balanced in amplitude on a single polarization; the angle of the polarizer may be 45°, but it may also be different.

Amplitude-modulated light radiation is therefore produced at very high frequency (500 MHz to 10 THz) by beating and this modulated light radiation is used either directly in optical form or indirectly by converting it into an electronic signal at this very high frequency. The conversion may be done by a photodiode placed downstream from the polarizer, or by an ultrafast photomixer.

The resonant optical cavity is a Fabry-Perot cavity with partially transparent multilayer dielectric mirrors, with a very high reflection coefficient and very low absorption. These are Bragg mirrors consisting of multiple transparent dielectric layers with indices and thicknesses suitable for creating constructive interference at the light frequencies to be reflected. The cavity is a cavity with very high finesse, preferably at least 1000. It has multiple resonance frequencies separated by an elementary value called a "free spectral interval" linked to the distance between the mirrors, and the higher the reflection coefficient of the mirrors (but still less than 1 to preserve a partial transparency at the input and output of the cavity), the higher the finesse. The main output of the resonant cavity is a transmission output, i.e. an output through a partially transparent mirror opposite a partially transparent input mirror by which the laser beams enter. It can then be considered that the input mirror is also a secondary (reflected) output from the cavity; the polarization separator is placed so as to receive a fraction of the radiation from the secondary reflected output. Both polarizations from reflection on the input mirror will be used to control the frequencies of the dual-frequency laser for seeking to obtain two light frequencies each tuned to a respective resonance peak of the resonant cavity.

A beam splitter is preferably provided between the laser and the resonant cavity for transmitting a fraction of the radiation from the reflected output of the resonant cavity to the polarization separator.

The servo control of the laser frequencies, i.e. the locking of these frequencies on a pair of values which result in the desired beat frequency is preferably done via the Pound-Drever-Hall method based on the interrogation device of the resonant cavity. This method uses the light radiation reflected onto the input mirror of the resonant optical cavity: when the frequency of the laser beam is not exactly tuned to a resonance frequency of the cavity, the input mirror of the cavity reflects a larger portion of the untuned light beam and this portion is used for servo control.

The interrogation device of the cavity preferably includes a modulation frequency generator, a phase modulator placed on the path of the light beams upstream from the resonant cavity, the phase modulator being controlled by the frequency generator for modulating the phase of these beams at a determined frequency, and a mixer at the output of each photodiode for modulating the output signal of the photodiode at the determined frequency before applying it to light frequency adjustment inputs of the laser. In the vicinity of a resonance frequency of the cavity, the phase of the reflected energy modulated by the frequency generator varies with the difference between the light frequency received by the cavity and a resonance frequency of the cavity. This phase variation is used for servo controlling frequency in a direction tending in principle to minimize the frequency difference.

The addition of this phase modulation of the beam is used to introduce sign discrimination of the difference signal with respect to the resonance (without this phase modulation, the difference signal would have the same sign regardless of the direction of the frequency difference and servo control would be more difficult).

The servo control means may include a photodiode which converts the reflected signal into an electrical signal used for acting on the frequency adjustment inputs of the laser. There is a photodiode for each of the two polarizations to be controlled. The photodiodes are placed downstream from the polarization separator so as to each receive a respective polarization from this separator.

According to the composition of the dual-frequency laser, the frequency adjustment inputs of the laser may be:
either two inputs acting separately on the two frequencies,
or a first input acting on the average frequency of the laser (i.e. the half-sum of the dual-frequency laser frequencies) and a second input acting on the difference between the two frequencies.

The servo control means obviously take this composition into account.

BRIEF DESCRIPTION OF THE DRAWINGS

Other features and advantages of the invention will become apparent upon reading the following detailed description with reference to the accompanying drawings in which the single FIGURE represents a diagram of the device according to the invention.

DETAILED DESCRIPTION

The device for producing very high frequency shown in the FIGURE includes a dual-frequency laser L emitting a single beam resulting from the superposition of beams having light frequencies F1 and F2 and having orthogonal polarizations.

The beam at frequency F1 is shown as a dashed line; the beam at frequency F2 is shown as a continuous line. The two beams are shown geometrically separated, but in reality they are mixed together and there is only one beam path except when the beams are separated according to their polarization.

The polarization of the beam at frequency F1 is considered vertical (V), the other is horizontal (H).

The dual-frequency laser L has two frequency adjustment inputs E1 and E2. In the example shown in FIG. 1, the input E1 acts on the frequency F1 and the input E2 acts on the frequency F2. These inputs receive respective electronic signals from servo control means; the servo control means are for stabilizing the frequencies F1 and F2 at values such that the beat frequency (F1−F2) is stabilized very precisely at a desired very high frequency value Fs at the output of the device.

For adjusting the frequencies F1 and F2 emitted by the laser, provision is made, for example, for inserting one or more elements for adjusting the optical path length within a resonant cavity forming part of the laser. The adjustment element is, for example, a voltage-controlled electro-optical crystal plate. The voltage applied is used to modify the refractive index of the plate, therefore the optical path length in the laser cavity, and therefore the frequency at which the laser emits. Two electro-optical crystals, for example, will be placed in a dual-frequency laser, respectively controlled by the signals applied to the inputs E1 and E2, each on the optical path of the beam that it has to control.

The output beam of the laser is therefore a beam superposing two light frequencies of values F1 and F2 which are adjustable independently of each other by the servo control means, and having orthogonal polarizations.

This beam first passes through a phase modulator MOD which will be referred to later: it modulates the phase of the electromagnetic wave at a low frequency in relation to the light frequencies and in relation to the difference of these frequencies. This may be a modulation at 10 MHz for example. This modulation frequency is produced by a frequency generator GHF.

Then, the beam thus modulated, having two orthogonal polarizations, passes through a beam splitter LS. One fraction of the beam B', directed upwards in the FIGURE, forms an output of the device; the other fraction is directed towards the cavity. The beam reflected by the cavity is separated on the splitter LS; one fraction is directed to the servo control means; this fraction comprises both the two frequencies and the two polarizations; a Faraday isolator, not shown, is preferably placed between the laser L and the beam splitter LS so that the return light does not interfere with the laser. This isolator acts on both polarizations.

The beam fraction which passes through the splitter LS enters the input face of a resonant optical cavity OC. The cavity is a cavity of very high dimensional stability which will act as a standard for adjusting the laser frequencies F1 and F2. It is preferably a Fabry-Perot cavity having an input mirror ME and an output mirror MS, both mirrors partially transparent but with a reflection coefficient close to 1 for light with a light frequency of F1 or F2. These are in principle (but not necessarily) Bragg mirrors.

In addition, the distance between the mirrors defines the possible resonances of the cavity very precisely, the resonance wavelengths being submultiples of the length of the cavity, i.e. the distance between the mirrors. The free spectral interval is the difference between two resonance frequencies corresponding to two successive submultiples. As will be seen, knowing this spectral interval can be used to ascertain the exact value of the high frequency Fs=F1−F2 that is wanted thanks to the device.

At the cavity input, the dual-frequency and dual-polarization laser beam, modulated by the phase modulator MOD and having passed through the beam splitter LS, enters through the input mirror which is partially transparent. It is reflected multiple times in the resonant optical cavity; a fraction of this beam exits through the partially transparent output mirror MS. This fraction comprises two components which are respectively at frequencies F1 and F2 with orthogonal polarizations.

The exiting fraction is combined in a polarizer POL in a single polarization beam. Preferably the angle of the polarizer's polarization axis is adjusted for combining the beams in a balanced manner. The angle will generally be 45° but it may be different, e.g. between 40° and 45°. Another angle adjustment may also be chosen for adjusting the depth of modulation.

At the output of the polarizer POL, there is a single beam B which can be considered as a light beam with a light frequency of (F1+F2)/2 sinusoidally amplitude-modulated by the beat frequency Fs=F1−F2 which is the very high frequency that is sought.

One fraction of the beam, which undergoes multiple reflections inside the cavity re-emerges through the input mirror ME which may then be considered to constitute a secondary output of the cavity.

Therefore, in general, a fraction of each of the two laser beams re-emerges from the input mirror ME, and the re-emerging fractions are respectively linked, independently of each other, to the detuning between the frequency F1 and a resonance frequency Fr1 of the cavity, and to the detuning between the frequency F2 and a resonance frequency Fr2 of the cavity. The frequencies F1 and F2 will be servo controlled on the respective resonance frequencies Fr1 and Fr2 which are selected according to the high frequency Fs which is sought.

Servo control takes place in the following way: the beam fractions at frequencies F1 and F2 re-emerging from the cavity through the input mirror are directed to the beam splitter LS; they are modulated by the modulator MOD and their phase depends on the respective detunings F1−Fr1 and F2−Fr2. From there they are directed to a polarization separator SP which separates the beams according to their polarization. The beam portion with vertical polarization and of frequency F1 is directed to one side, to a photodiode PH1. The beam portion with horizontal polarization and of frequency F2 is directed to another side, to a photodiode PH2. These photodiodes deliver electronic servo control signals which, after being mixed by demodulators DM1, DM2 at the frequency of the generator GHF that has been used to control the modulator MOD, constitute amplitude error signals which become greater as the frequency tuning difference increases (when in the vicinity of the tuning).

These electronic signals are processed, for example by respective amplifiers or more sophisticated processing circuits AMP1 and AMP2, and applied to the inputs E1 and E2 of the laser for controlling the adjustment of frequencies (in principle in a direction tending to minimize the tuning difference, but possibly also in a direction tending to maintain this difference at a certain value).

The laser thus tends to adjust then stabilize each of its transmission frequencies on a respective frequency Fr1, Fr2.

Returning now to the phase modulator MOD, its presence serves to introduce a phase modulation of the beam at low frequency (e.g. 10 MHz) on the incident beam. This modulation creates lateral subcarriers on each side of the laser's light frequency. These frequencies do not resonate in the optical cavity and they provide a phase reference at the secondary output of the cavity. Computing the error signal associated with the difference between the laser frequency and the resonance frequency of the cavity shows that these sidebands dissymmetrize the error signal. In the absence of phase modulation, the error signal displays a minimum when the frequencies are tuned, but it rises symmetrically when detuning occurs, so that a difference may be found without being able to determine in which direction to act in order to reduce it. After phase modulation, the error signal varies linearly around the tuning frequency so that the direction of the observed error can be discriminated.

The phase modulator is a single voltage-controlled electro-optical crystal, modifying the refractive index of the crystal according to the electrical voltage applied, which modifies the optical path and therefore the phase of the beam.

Accordingly, a frequency generator GHF controls the phase modulator MOD and also controls respective demodulators DM1 and DM2 which receive the phase-modulated signal received by the photodiodes. The output of the demodulator provides an error signal whose value represents not only the frequency difference observed but also its direction.

The outputs of the demodulators DM1 and DM2 are applied to the inputs of the amplifiers or processing circuits AMP1 and AMP2 which apply control signals to the two inputs of the laser.

In summary, the interrogation device of the resonant cavity, whose function is to provide an error signal representing the frequency tuning difference, includes the frequency generator GHF, the modulator MOD and the demodulators placed downstream from the photodiodes PH1 and PH2.

It is possible, with the aid of a summing circuit, to add a DC voltage to one and/or the other of the error signals for partly adjusting the output frequency Fs of the device. In this case there is no attempt to minimize the difference between the frequencies F1 and F2 and the resonance frequencies of the cavity, but this difference is maintained at a constant value.

Given that some dual-frequency lasers may have two inputs for adjusting on the one hand the common mode light frequency, i.e. the half-sum (F1+F2)/2, and on the other hand the difference in frequencies, it will be understood that in this case the signals delivered by the circuits AMP1 and AMP2 are premixed in an addition-subtraction circuit for producing a sum error signal (to be applied to the first input) from the sum of the error signals originating from the demodulators and a difference error signal (to be applied to the second input) from the difference of the error signals.

The output frequency Fs which modulates the beam B at the output of the cavity is substantially Fs=Fr1−Fr2 when the servo control is operating, i.e. when the differences F1−Fr1 and F2−Fr2 are minimized by the servo control. The greater the stability of the resonant cavity dimensions, the greater the stability of this frequency, since it is the cavity that is used as a reference for the servo control of frequencies F1 and F2.

The output beam B which results from the superposition of the beams at frequencies F1 and F2 is a beam whose frequency may be considered as the average of the two frequencies F1 and F2 and whose amplitude is modulated sinusoidally so as to be extremely stable in phase, at the beat frequency Fs=F1−F2, and therefore Fr1−Fr2 when tuning is performed.

This beam B can be used directly, e.g. for remote optical transmission through air or via optical fiber. It can also be applied to a photomixer (e.g. a crystal with nonlinear properties) for producing electromagnetic radiation directly at the beat frequency, radiation which can be emitted through the air via an antenna connected to the photomixing crystal. Or again, the output beam B can be directed to a fast photodiode for being converted into an electrical signal S which is extremely stable in phase, at the frequency Fs.

The output of the device may in some cases be sampled not at the transmission output of the cavity, but upstream from the cavity, more precisely at the second output (beam B') of the beam splitter LS, the first output of the beam splitter being that which is located upstream from the input face of the cavity. The polarizer POL combining the polarizations of the two beams is then placed in the path of the beam B' at the upper output of the beam splitter LS.

In a variant embodiment, it is conceivable that the polarizer POL is not placed immediately at the transmission output of the cavity or at the upper output of the beam splitter but well away from these locations. The superposed laser beams with orthogonal polarizations are then used to remotely propagate the energy and the phases of the beams, and the polarizer POL is placed at the distal end of this propagation path, in front of a photodiode or a photomixer or a transmitting antenna. The beat frequency signal is available at this location in the form of an electrical signal or in the form of a wave radiated by the antenna.

The smaller the free spectral interval, the greater the number of output frequencies F=Fr1−Fr2 (stable frequency obtained when the servo control operates) that can be produced in this way. In addition, it is desirable that the finesse of the cavity (free spectral interval divided by the width at mid-height of the resonance peak) is very large, which implies having mirrors with a reflection coefficient very close to 1 with little absorption.

The beat frequencies produced are frequencies Fr1−Fr2 that are multiples of the free spectral interval of the cavity. In practice, in order to obtain a desired frequency Fs, each of the carriers will first be locked by servo control onto two resonance frequencies separated by a single free spectral interval (FSI). The resulting very low frequency beat is measured by comparison with a calibrated low frequency oscillator. The result is a reference value f. The nearest integer N of Fs/f is determined from the desired output frequency value F. Then, keeping one of the polarizations servo-locked, e.g. the H polarization at frequency Fr2, the frequency of the other polarization will be progressively varied by increasing the interval between the two frequencies, and by counting the successive Airy peaks at the output of the cavity as this difference increases. The process stops when N−1 successive resonance peaks have been counted after the initial locking at 1 FSI, and the servo control for locking the second polarization onto the adjustment obtained is released. For this, the laser preferably comprises two manual adjustment inputs Er1 and Er2 for performing this initial adjustment, after which the inputs E1 and E2 ensure servo control on the initially adjusted value.

The performance of the device according to the invention is essentially linked to that of the resonant optical cavity since it is the resonance frequencies of the optical cavity which serve as a reference standard for servo-controlling the light frequencies of the laser; the higher the stability of the resonance frequencies Fr1 and Fr2, the better the stability of the beat frequency Fs. The stability of the resonance frequencies is itself linked to the dimensional stability of the cavity, and in particular to the distance between the input mirror and the output mirror. Therefore a cavity of high dimensional stability will be used, constructed from materials with a coefficient of thermal expansion as close to zero as possible. In particular, a cavity constructed of ULE (Ultra Low Expansion) material will be used, which has the property of having an expansion coefficient which cancels out at a temperature of around 20° C.

Preferably a suspended cavity will be chosen for minimizing the influence of vibrations. The cavity may be arranged with its vertical axis for minimizing deformations due to gravity.

In the foregoing, the possibility has not been mentioned of other dual-frequency adjustment elements. However, in addition to the servo control of frequency, a servo control of amplitude may be provided. This is because it is desirable to stabilize the intensity of each of the two beams in order to avoid amplitude noise on the cavity output beam. The intensity may be stabilized on each of the polarizations at the cavity output (upstream from the 45° polarizer), by sampling a portion of the cavity output beam energy, separating the polarizations, and sending the polarizations thus separated to photodiodes. The photodiode outputs, filtered and compared to a set point value, can be used as intensity servo control signals applied to laser intensity adjustment inputs. Alternatively it could be provided for the laser power to be servo controlled from a sample of a beam fraction at the laser output rather than at the cavity output, e.g. on an output of beam B' from the beam splitter LS, but this solution is not as good since it does not take into account variable power losses that may appear between the laser output and the cavity output.

The interrogation device of the resonant cavity which has been described above uses the reflection of the laser beam on the input mirror of the cavity to produce an error signal. Another method of interrogation could be envisaged, such as the 'tilt-locking' method consisting in slightly varying the incidence of the laser beam with respect to the normal incidence; thus an error signal can be created which depends on the match between the laser frequency and the resonance frequency of the cavity under normal incidence. In this interrogation method, the laser beam is slightly inclined with respect to the resonant beam in the cavity. The photodiode is composed of two active parts, separated in the direction of inclination of the beam. The electrical signals from the two parts of the photodiode are subtracted from one another to obtain the error signal. Other methods of interrogation of the cavity are conceivable ('dither locking', meaning locking by frequency agitation; 'side locking', meaning side-of-fringe locking); these methods make it possible to avoid using a modulator.

In the foregoing it has been assumed that the light frequencies F1 and F2 of the laser beams should each be tuned on a respective resonance frequency of the cavity, the possible frequencies being discrete values separated by the free spectral interval. The free spectral interval is linked to the dimensions of the cavity and is equal to c/2L (cavity under vacuum) where c is the speed of light and L is the distance between the mirrors. The longer the cavity is, the smaller the free spectral interval.

In one development, a birefringent electro-optical element may be inserted into the cavity. This element introduces an increase in optical path, which differs according to the polarization of the light, and is adjustable via an electrical voltage applied to the element (this voltage acts on the refractive index of the element, and therefore on the length of the optical path traveled by light in the element). The action of the electrical voltage may, for example, affect one of the orthogonal polarizations but not the other. The optical dimension of the cavity is then L'=L+dL, dL being the additional optical length introduced by the presence of the element. If the value dL varies according to the electrical voltage for one of the polarizations but not for the other, the value of one of the series of resonance frequencies Fr1 and Fr2 can then be electrically modified but not the other. Adjustment may be continuous. Continuous variation of the resonance frequency can thus be achieved by electrical adjustment for the polarization affected by the birefringent element, over the whole range corresponding to the free spectral interval. There is then a continuous adjustment of the output frequency over a very wide range.

Instead of detecting the beat frequency in a photodiode or a photomixer, the superposed beams with combined polarizations can be applied (after the polarizer POL) to a microwave antenna (a terahertz antenna if the frequency is one or more terahertz). This antenna emits an electromagnetic wave at the beat frequency.

A portion of the laser beam paths can be carried on optical fibers. If it is the portion upstream from the resonant cavity, the beam splitter LS may be replaced by an optical circulator. In this case the beam B' output does not exist.

It was assumed above that the two optical frequencies with orthogonal polarizations interrogated the cavity on one side of it, but it could be envisaged that the interrogation by the two frequencies each takes place on a different side of the cavity.

Furthermore, it has been mentioned that the error signals generated by the Pound-Drever-Hall method with the aid of the GHF generator can be used for measuring the difference between the resonance frequencies of the cavity and the laser frequencies F1 and F2. But they also enable the measurement (with reduced sensitivity by a factor of 2) of differences between the resonance frequencies of the cavity and the frequencies F1±Fmod and F2±Fmod if Fmod is the GHF generator frequency. This measurement increases the possibilities of selecting the desired beat frequency.

The invention claimed is:

1. A device for producing amplitude-modulated radiation at a very high frequency, from a beat frequency of two laser beams emitting different light frequencies, the device comprising:
   a resonant optical cavity having very stable dimensions receiving the two laser beams, said resonant cavity having at least two different resonance frequencies;
   for each laser beam, a respective interrogation device of the resonant cavity capable of supplying an electrical signal representing the difference in frequency between the light frequency of the beam and a resonance frequency of the resonant cavity, and
   servo control means for separately controlling the light frequency of each of the laser beams according to the frequency difference observed,
      wherein the laser beams have orthogonal polarizations, and the servo control means comprise a polarization splitter for the separate servo control of the beams according to their polarization, and a polarizer is placed at the output of the device on the path of the two superposed beams for producing a radiation beam for producing an electromagnetic beam combining the two polarizations and amplitude-modulated at the beat frequency.

2. The device as claimed in claim 1, wherein the two laser beams are produced by a dual-frequency laser producing two beams with the same axis having different frequencies and orthogonal polarizations.

3. The device as claimed in claim 1 wherein the polarizer is a polarizer at 45°, combining the two laser beams in a single polarization in balanced proportions.

4. The device as claimed in claim 1 wherein the polarizer is a polarizer combining the two laser beams in a single polarization in different proportions.

5. The device as claimed in claim 1 wherein the output of the device is located downstream from a transmission output of the resonant cavity.

6. The device as claimed in claim 1 wherein the output of the device is located upstream from the resonant cavity.

7. The device as claimed in claim 1 wherein the resonant cavity comprises a secondary reflected output, and in that the polarization splitter receives a fraction of the radiation from the secondary reflected output of the resonant cavity.

8. The device as claimed in claim 7, wherein a beam splitter is provided upstream from the resonant cavity for transmitting a fraction of the radiation from the reflected output of the resonant cavity to the polarization splitter.

9. The device as claimed in claim 7 wherein the servo control means include two photodiodes placed so as to each receive a respective polarization from the polarization splitter.

10. The device as claimed in claim 9, wherein the interrogation device of the cavity includes:
    a frequency generator,
    a phase modulator placed on the path of the light beams upstream from the resonant cavity, the phase modulator being controlled by the frequency generator for modulating the phase of these beams at a determined frequency,
    and a mixer at the output of each photodiode for modulating the output signal of the photodiode at the determined frequency before applying it to light frequency adjustment inputs of the laser beams.

11. The device as claimed in claim 1 wherein the laser beams are produced by a dual-frequency laser including an electronic signal input for adjusting the half-sum of the light frequencies of the two beams and an input signal for adjusting the difference of the two light frequencies, or alternatively an electronic signal input for adjusting one of the light frequencies and another electronic signal input for adjusting the other light frequency.

12. The device as claimed in claim 1 further comprising, on a main output of the device, downstream from the polarizer, a photodiode, a photomixer or a terahertz antenna for producing an amplitude-modulated signal at the beat frequency of the light radiation emerging from the polarizer.

* * * * *